United States Patent [19]
Ferket et al.

[11] Patent Number: 5,713,788
[45] Date of Patent: Feb. 3, 1998

[54] AUTOMATED SYSTEM FOR PREPARING ANIMAL CARCASSES FOR LACTIC ACID FERMENTATION AND/OR FURTHER PROCESSING

[75] Inventors: Peter R. Ferket; Larry F. Stikeleather, both of Raleigh; Jerry R. McKeithan, Jr., Arden, all of N.C.

[73] Assignee: North Carolina State University, Raleigh, N.C.

[21] Appl. No.: 699,479

[22] Filed: Aug. 19, 1996

Related U.S. Application Data

[63] Continuation-in-part of Ser. No. 356,686, Dec. 15, 1994, Pat. No. 5,547,420.

[51] Int. Cl.[6] ............................................. A22C 17/00
[52] U.S. Cl. ................... 452/138; 452/142; 241/15; 241/21; 241/38
[58] Field of Search ...................... 452/138, 141, 452/142; 241/243, 260.1, 15, 16, 21, 38, 39

[56] References Cited

U.S. PATENT DOCUMENTS

| | | | |
|---|---|---|---|
| 2,138,715 | 11/1938 | Thorsen | 241/38 |
| 2,141,663 | 12/1938 | Ossing | 241/38 |
| 3,685,747 | 8/1972 | Horstman | 241/15 |
| 4,339,084 | 7/1982 | Eriksson | 241/260.1 |
| 4,524,916 | 6/1985 | Keyes et al. | 241/101.76 |
| 5,076,504 | 12/1991 | Young | 241/92 |
| 5,402,950 | 4/1995 | Beaer et al. | 241/260.1 |
| 5,512,015 | 4/1996 | Teran | 452/141 |
| 5,580,305 | 12/1996 | McFarland | 452/138 |

*Primary Examiner*—Willis Little
*Attorney, Agent, or Firm*—Richard E. Jenkins, P.A.

[57] ABSTRACT

A poultry and swine pulverizing or grinding apparatus comprises an enclosed housing having an inlet end and an outlet end. A grinding drum is rotatably mounted within the enclosed housing and provided with raised cutting teeth extending in a helical orientation along the longitudinal length of the grinding drum. A carcass retention element is positioned adjacent the length of the grinding drum and cooperates therewith to facilitate pulverizing or grinding of animal carcasses by the grinding drum into small size particles which exit the housing through the outlet end. The grinding drum of the apparatus is motivated by an operatively connected motor. Also described is an automated system for preparing animal carcasses for lactic acid fermentation and/or further processing utilizing the aforesaid grinding apparatus.

15 Claims, 14 Drawing Sheets

AUTOMATED SYSTEM FOR PREPARING ANIMAL CARCASSES FOR LACTIC ACID FERMENTATION AND/OR FURTHER PROCESSING

RELATED APPLICATION

The present application is a continuation-in-part application of Ser. No. 08/356,686 filed Dec. 15, 1994, and now U.S. Pat. No. 5,547,420.

TECHNICAL FIELD

The present invention relates to the automated processing of animal and fish carcasses, offal, hatchery waste, and other food by-products for the purpose of ensilage preservation and/or conversion into feed ingredients or other higher valued products.

BACKGROUND ART

The increased public concern for the environment and the resulting stricter regulations regarding the disposal of proteinaceous waste presents a significant challenge for industries involved in food production. This is especially true in the poultry and hog industries. These industries must dispose of a large amount of solid wastes from processing plants, hatcheries and from normal on-farm mortality. Almost all of the solid by-products from processing plants (approximately 25% of live weight) are currently converted into animal by-product meals and fat by the U.S. rendering industry for use in animal and pet foods, and other industries (i.e., paints and plastic manufacturing). Only about 5% of the waste from farms and hatcheries are rendered primarily because of high transportation costs and inferior quality of the material.

The amount of by-product wastes from U.S. poultry and swine farms and hatcheries that must be disposed or utilized is huge and this presents significant environmental, biological, and financial problems for this industrial sector. A typical flock of 10,000 turkeys will produce about 5 tons of dead carcasses during an 18-week growing period. A flock of 20,000 broilers grown to 49 days of age will produce about 1 ton of dead carcasses. A 1000-sow farrow-to-finish unit will produce about 7.5 tons of dead carcasses per year. Using recent U.S. poultry and swine production estimates, over 800,000 tons of dead poultry and hatchery wastes and over 500,000 tons of dead hogs are disposed (Council of Agricultural Science and Technology (CAST, 1995).

The majority of dead poultry and swine, and hatchery wastes are disposed by burial in landfill and on-farm disposal pits, incineration, composting, and rendering. Each of these methods have particular regulatory, economical, operational, or ecological limitations. Only rendering dead stock and hatchery wastes into feed ingredients provides the most efficient recycling of nutrient resources, but the potential risk of spreading disease and limitations in collection and quick transport from farm to rendering plant prohibits its wide use.

Alternative methods of disposal that allow for the conversion of animal by-product wastes into useful and valuable products is desperately needed, especially in areas of dense poultry and swine populations. Lactic acid fermentation of mortality offers hope of economically disposing dead stock without contaminating the environment with excessive nutrients and odor. It may also provide an income from subsequent recovery and recycling into feed ingredients. The ensiled product is stable during long-term storage, which minimizes farm-to-farm collection frequency. The acidic pH (4.0–5.5) of the product is essentially free pathogenic viruses and bacteria, so it can be stored and transported to a rendering plant or other user without risk of spreading disease to animals or man.

However, the lactic acid fermentation method for disposing of on-farm swine and poultry carcasses has not been widely used to date because of the very intensive labor requirement to grind the waste materials into small particles. Applicant has developed a relatively low cost and easy to use apparatus for grinding animal carcasses into small particles and has now met the long-felt need for such an apparatus to facilitate wider use of lactic acid fermentation process for disposing of poultry and swine carcasses as well as many other uses for the finely ground waste particles which are known to those skilled in the art.

Successful fermentation of animal carcasses, offal, and hatchery waste can be accomplished by grinding these materials into small particles (0.25 inch diameter) and mixing this with an appropriate amount of readily fermentable carbohydrate water, and fermentation culture. Other components, such as proteolytic enzymes and antioxidants, may also be added to enhance the quality of the end product. This mixture is then placed in a sealed, but vented container to encourage and maintain anaerobic fermentation.

Carbohydrate sources that have been used to successfully ferment carcasses and offal include, but are not limited to, lactose from whey products, glucose, sucrose, whey permeate, molasses, and condensed brewers solubles. Water may need to be added to the mixture to attain the optimum moisture level of 60 to 70% in the fermentation product. Regardless of the carbohydrate source, a minimum of 6% fermentable carbohydrate, referred to as invert sugar, thoroughly mixed with animal carcass by-product on a weight-:weight basis is required to drive the lactic acid fermentation and sustain a pH 4.5 or less. Higher levels of invert sugar may be necessary at less than optimal fermentation temperature (<35° C.) or if the product is stored for a prolonged period of time (>14 days).

The rapid reduction of pH during the fermentation is a result of the accumulation of organic acids (lactate, propionate, acetate, and butyrate) produced by anaerobic bacteria. A sufficient amount of these acid producing bacteria to drive the fermentation are typically part of the natural microflora of the carcass. However, about 1 million CFU of supplemental bacteria added per pound of silage may induce an accelerated rate of fermentation as well as provide a margin of safety under diverse operating conditions. Microbial species that have been shown to be effective as a supplemental fermentation culture include *Pediococcus acidilactici*, *Lactobacillus plantarum* and *Streptococcus faecium* M74. Several researchers have conducted studies on the optimization of poultry carcass and offal fermentation (see, Murphy et al., "Carcass Preservation Systems—Lactic Fermentation", *Proceedings* 1990 *National Poultry Waste Management Symposium, Raleigh, N.C. and National Poultry Waste Management Symposium Committee, Auburn University, Alabama;* pp. 56–63 (1990); Conner et al., "Levels of Carbohydrate Needed To Support Endogenous Fermentative Stabilization of Poultry Carcasses and the Effect of Propionic Acid on Fungal Growth", *Poultry Sci.* 71(1) p. 29 (1992); Conner et al, "Fermentative Stabilization of Poultry Farm Mortalities", *Poultry Sci.* 70(1) p. 28 (1991); and Cai et al. "Stabilization of Poultry Processing By-Products and Waste and Poultry Carcasses Through Lactic Acid Fermentation", *J. Appl. Poultry Res.* 3 pp. 17–25 (1994)). Pathogenic microorganisms (i.e., *coliforms, salmonellae, clostridia*) associated with the carcasses are effectively inactivated during the fermentation process (see, Dobbins, "Lactobacillus Fermentation: A Method of Disposal/Utilization of Carcasses Contaminated by Pathogenic Organisms or Toxic Chemicals" *Proceedings 1988 National Poultry Waste Management Symposium*, Columbus, Ohio, pp. 76–80 (1988); Murphy et al., "Lactic acid Fermentation of Whole Broiler Carcasses", *Poultry Sci.* 69(1) pp. 98 (1990); Parsons et al., "Alternative Dead Bird Disposal Methods—Central Pickup and Fermentation" *Proceedings of the North Carolina State University Poultry Supervisors Short Course*, Raleigh, N.C., pp. 7–20 (1990); Shotts et al., "Antimicrobic Effects of Lactobacillus Fermentation on Edible Waste Material Contaminated With Infected Carcasses", *An. J. Vet. Res.*, 45 pp. 2467–2470 (1984).

On-the-farm ensilage preservation of swine and poultry carcasses has not been widely used because of the intensive labor required to grind, mix the appropriate amount of catalyst (invert sugars, enzymes, and inoculant), and transfer the material to an anaerobic container. Moreover, the extensive manual labor and unavailability of proper equipment results in frequent fermentation failures, great variability of end product, and much risk to worker safety. Therefore, automation is necessary for wide application of the fermentation technology. Such an automated system, subsequently referred to as the invention, reduces manual labor and helps produce a consistent high quality added-value product. This automated system accomplishes the following functions: (1) Quickly grinding material of variety of sizes, shapes, and textures into a homogenous mass consisting of particle sizes of 5.0 mm or less; (2) Automatically dispensing the appropriate amount of catalyst and substrate onto the ground material; (3) Mixing the ground and dispensed material into a homogenate; and (4) Conveying the material through a hose or pipe to vented container for storage and/or ensilage fermentation.

DISCLOSURE OF THE INVENTION

In accordance with the present invention, applicant provides an apparatus for pulverizing animal carcasses and the like comprising an enclosed housing having an intake opening and an outlet opening. Grinding means is positioned between the intake and outlet openings of the enclosed housing for producing finely ground organic matter from animal carcasses thrown into the intake opening of the enclosed housing. The grinding means comprises a grinding drum having raised cutting teeth extending in helical orientation along the longitudinal length thereof and a longitudinally extending carcass retention means positioned adjacent the length of the grinding drum for cooperation therewith to facilitate pulverizing of animal carcasses by the grinding drum. A motor is provided for rotating the grinding drum of the animal carcass pulverizing apparatus of the invention.

In addition to the previously disclosed grinding mechanism, the present invention is a integration of several pieces of innovative technology which act in concert to automatically prepare and transfer the material in a form and mixture suitable for ensiling or further processing. There are four major aspects of design integrated with the previously described grinding mechanism: (1) Optional material input agitator; (2) Automatic catalyst feed and mix system; (3) Bridge breaker assembly; and (4) Material transfer via a grinding pump for subsequent processing (lactic acid fermentation, storage, or other processes).

The material input agitator is an optional device to assist in the feeding of material onto the grinding drum. This device helps prevent input material from bridging above the grinding drum, impeding flow, and it helps position the material onto the grinding surface of the drum to enhance material flow through the grinding mechanism. This device is optional, depending upon the subject material required to grind. The agitator is constructed as a rotating bar which is the same length as the grinding drum rotating on a centerline approximately 8 inches directly above the grinding drum. The bar is offset from the centerline of rotation by approximately 7.0 inches so that it misses the top of the grinding drum by approximately 1.0 inch as it rotates by the drum. The bar is attached to a shaft going through the top hopper along the centerline of rotation. The agitator shaft rotates at approximately 60 rpm and is driven by a chain and sprocket off the lower bridge breaker shaft which is driven by the material transfer pump drive shaft. On models without a lower bridge breaker shaft, the agitator is directly driven by a gear motor mounted on the main frame.

The automatic catalyst feed and mix system is an essential component after the carcass or subject material is pulverized by the drum grinding mechanism if fermentation, storage, or some subsequent biological, chemical, or physical treatment is necessary. The catalyst may be delivered as a liquid, solid, or gas and may include but not limited to fermentable carbohydrate, protein, biological enzymes, chemicals, minerals, and vitamins. The catalyst is delivered to the material at appropriate rates (which can be set by the operator) by an electric powered pump for liquids or electric powered auger for dry powdered or granular material. The delivery rate of the catalyst is proportioned to the flow rate of the grinding mechanism. For example, condensed brewer's solubles (fermentable carbohydrate source) can be delivered to poultry carcasses as they are pulverized at a rate such that the final mixture is 1 part condensed brewer's solubles to 5 parts pulverized carcasses.

Accurate delivery of the catalyst when and only when the subject material is ground is a critical aspect of subsequent processes. For example, too much or too little catalyst delivery to the subject material will result in an ineffective fermentation and thus poor quality product. Moreover, accurate timing of catalyst delivery with material grinding must occur to achieve adequate mixing of the two in appropriate amounts. Because the grinding of the material is rather intermittent phenomenon (i.e., carcasses or subject materials are thrown into the grinder at various amounts and rates), the delivery of the catalyst must likewise be intermittent. Therefore, the invention includes an innovative means to synchronizing catalyst delivery with the intermittent grinding of the subject material.

The automatic synchronization of catalyst delivery is a function of the load on the motor driving the grinding drum. In the electrically driven grinder motor, the electrical current flow increases as the load on the grinding drum increases as subject is being pulverized. The amount of electrical current flow can be electronically monitored such that it triggers the catalyst pump to turn on or off depending on a preprogrammed current set point. Therefore, in normal operation, the catalyst pump or auger turns on and off as the grinder drive current goes up and down coincident with intermittent grinding of the material. In gas engine-powered grinding drum, catalyst pump or auger is turned on and off by a switch connected to a mechanical load-sensing device integrated with the drive chain or belt.

In order to get a good mix of catalyst with the ground material, the catalyst is metered into the grinding area such that it comes into intimate contact with each ground particle immediately after grinding. Liquid catalyst is sprayed out across the output side of the grinding drum and dry catalyst is added just under the grinding area. Liquid catalyst is applied via a spray bar which is 0.5 inches in diameter and runs parallel along the full length of the grinding drum. The spray bar is located a few inches away from the grinding area behind the striker bar of the grinding mechanism. Small holes spaced 1 inch apart along the spray bar is positioned such that catalyst is applied as a spray into the output of the grinding area. The spray bar acts as a manifold as catalyst is pumped directly into the anterior end of the bar nearest the pump and the posterior end is occluded by an impermeable cap.

The bridge breaker assembly functions to further blend the catalyst and ground material, discourage bridging of the mass, and help feed that blended mass into the receiving hopper of the transfer pump. The poor flow characteristics of the ground material makes this assembly necessary to convey the material. The bridge breaker assembly is basically a paddle which is about the same size and shape as the opening of the small hopper of the transfer pump. The paddle is mounted on a shaft which is driven by a chain and sprocket off of the drive shaft of the material transfer pump. The bridge breaker paddle rotates as a slow speed (50 rpm) and with each 180° turn of the paddle dumps some ground material into the hopper of the pump. Without the bridge breaker assembly, the ground material will not convey efficiently into the transfer pump.

The material transfer pump functions to continue the mixing process, further grind material, compress the material to eliminate trapped air, and convey the material to a sealed container for lactic acid fermentation or any other subsequent process. A special progressive cavity pump, BORNEMANN Model No. #ER-375,600, or 1024, is used to transfer the ground and mixed material through a hose which provides an air-tight seal to the input of the tank. The internal design of a commercially available progressive pump was modified to enhance its performance with ground material produced by the grinding mechanism. One of the unique properties of this pump is to produce enough pressure to push material through a tube extending 35 feet upwards into the top of a large holding tank or push the material through a flexible undulating tube extending a much longer distance horizontally. This material transfer pump affords the advantage of conveying material in a great variety of configurations and adaptions.

The present invention provides a system to automatically precondition a variety of organic materials for further processing, namely but not limited to lactic acid fermentation or treatment with enzymes or chemical.

The objective is precondition (grind and amalgamate) carcasses of poultry, swine, fish, and other animals, vegetable waste, food waste, and other high moisture materials, such that it is suitable for subsequent fermentation, extrusion, dehydration, and/or disposal.

It is another objective to reduce volume of materials, blend different form materials with enzymes and chemicals that alter physical and chemical characteristics of the initial conglomerate.

It is another objective to accomplish the afforementions processes by a system that is inherently low in maintenance requirement, low in cost to use, and with low labor input for the operator.

It is still another objective of the invention to provide a system that is of simple construction, durable, and easy to repair using commercially available parts. Other objectives, features, and advantages will be apparent from the detailed description of the preferred embodiments with references to the drawings described hereinbelow.

Some of the objects of the invention having been stated hereinabove, other objects will become evident as the description proceeds, when taken in connection with the accompanying drawings as best described hereinbelow.

BEST MODE FOR CARRYING OUT THE INVENTION

Figure 1:
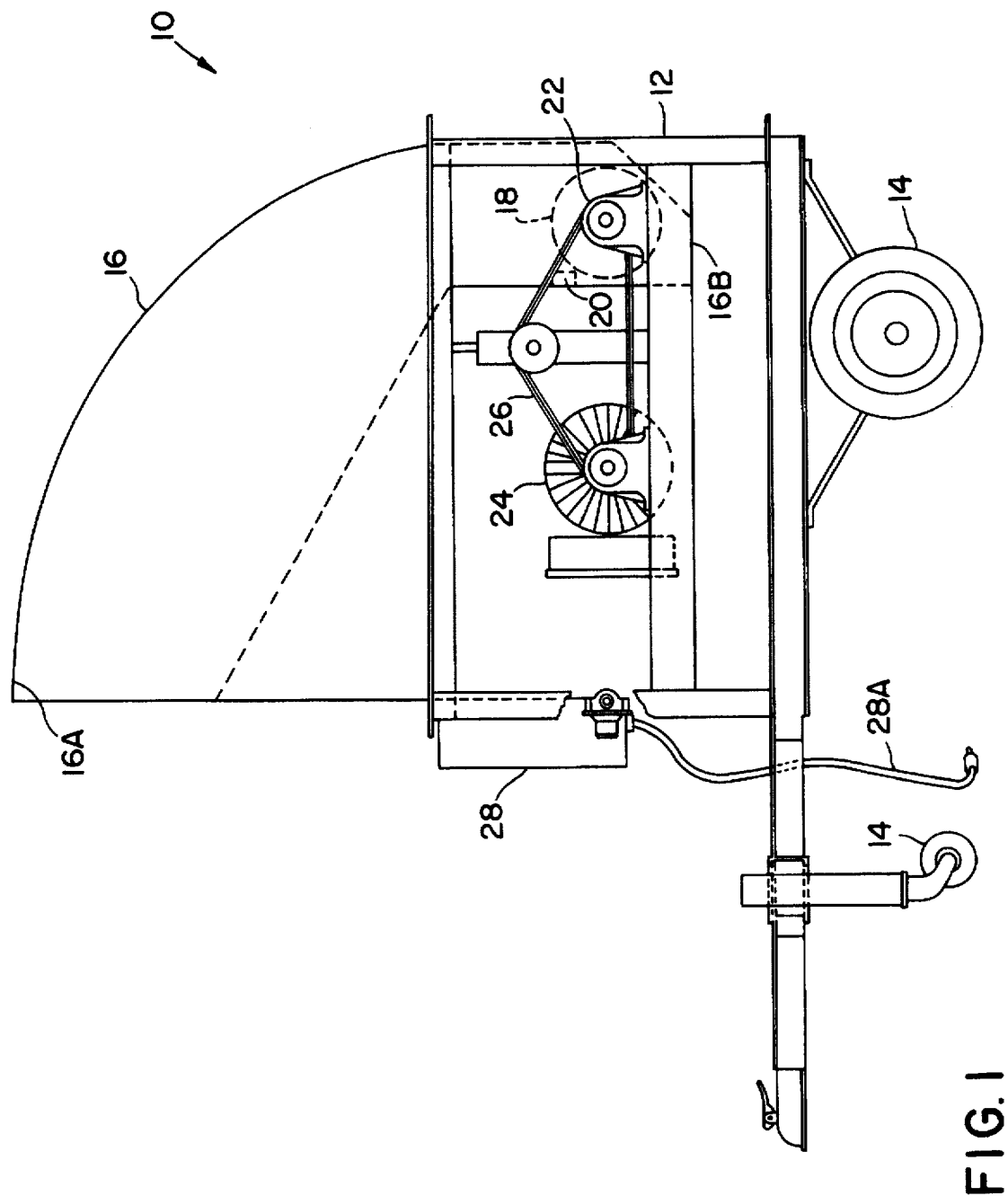
FIG. 1 is a side elevation of the animal carcass pulverizing apparatus according to the present invention.
Figure 2:
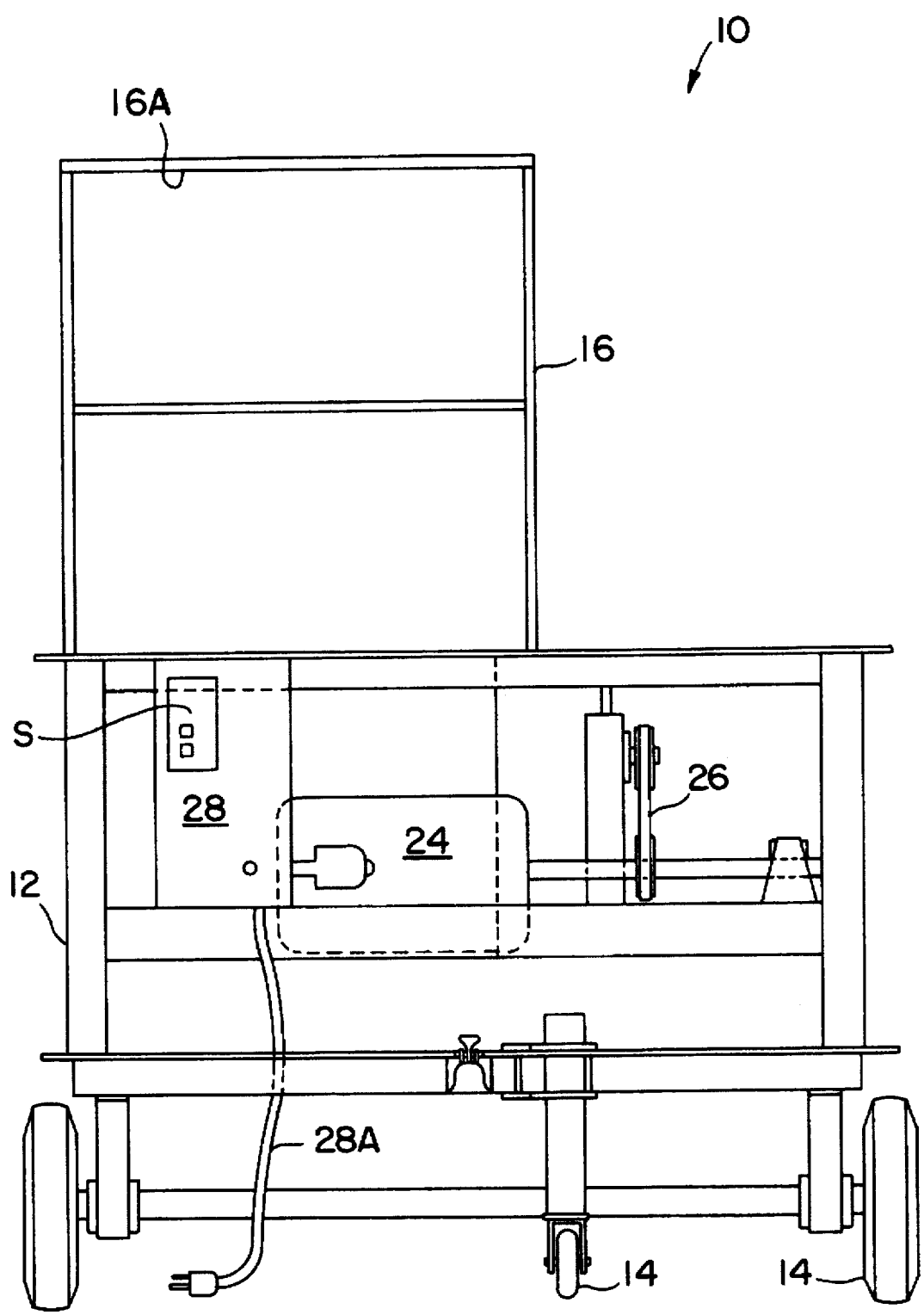
FIG. 2 is a front elevation view of the animal carcass pulverizer shown in FIG. 1.
Figure 6:
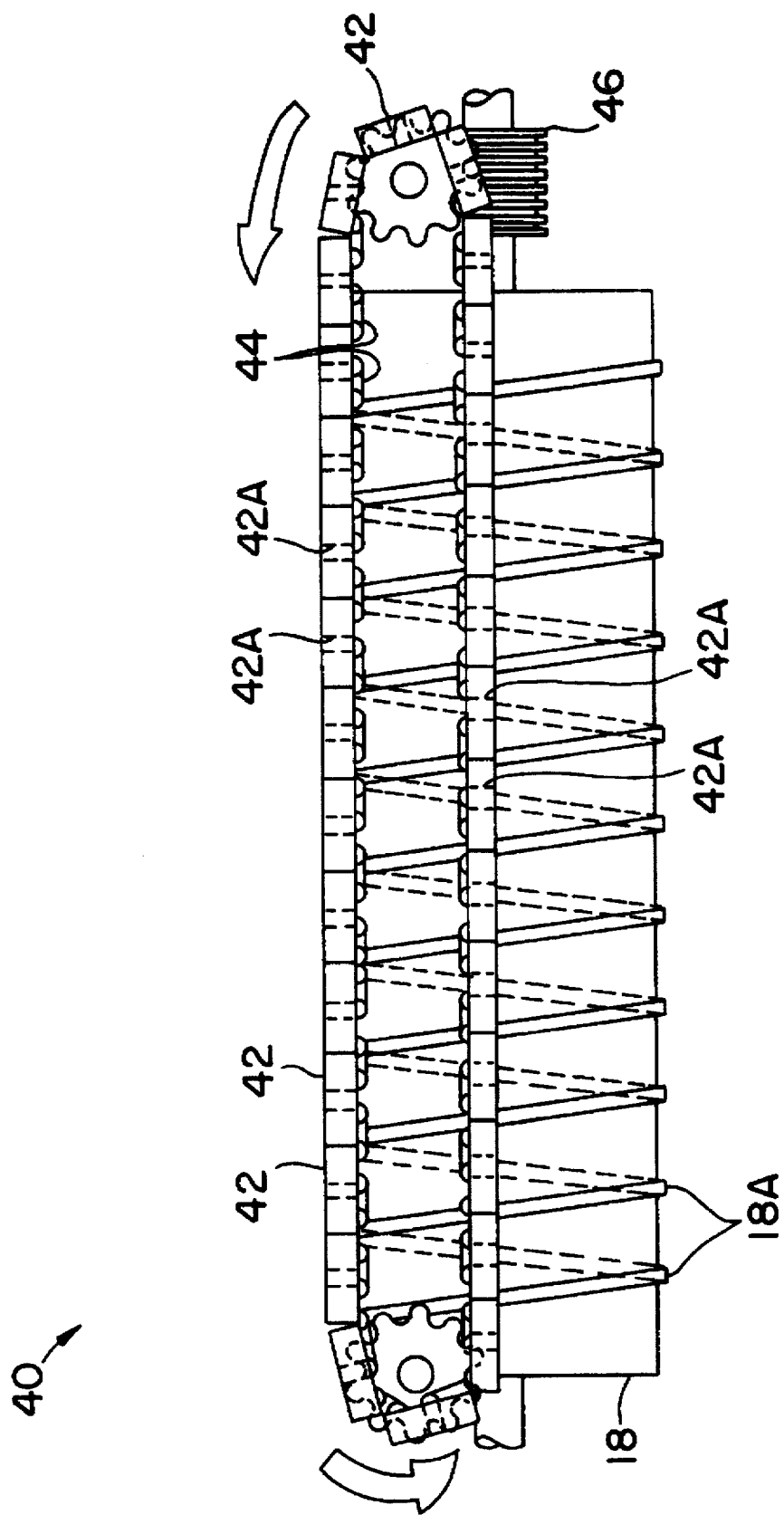
FIG. 6 is a front elevation view of a fourth embodiment of the grinding system utilized in the animal carcass pulverizing apparatus according to the present invention.

Referring now more particularly to the drawings, FIGS. 1, 2 and 6 illustrate the animal carcass pulverizing apparatus of the invention which is generally designated 10. Pulverizing apparatus 10 provides a grinder which is capable of very efficiently grinding organic matter such as poultry and swine carcasses into small, uniform particles. Apparatus 10 makes use of a readily available cutting device in the form of a length of chainsaw chain secured to a grinding drum (which will be described in detail hereinbelow) for ease of on-farm maintenance. Apparatus 10 may be used in a transportable embodiment as best shown in FIGS. 1, 2 and 6 or may be integrated with fermentation storage tanks or conveyors in order to dispose of the finely ground poultry and/or swine carcass material by techniques well known to those skilled in the art such as fermentation, deep burying, incineration, composting, extrusion, pelletizing, drying and the like. Regardless of which ultimate waste disposal procedure is utilized, prior pulverizing of the poultry or swine carcasses into small, uniform particles is beneficial and there is a long-felt need for an effective and economical apparatus to do so.

A preferred embodiment of apparatus 10 is best seen in FIGS. 1, 2 and 6 and comprises a frame 12 which is mounted on wheels 14 in a trailer-like configuration so as to be adapted to be pulled by a truck or other suitable vehicle (not shown). Pulverizing apparatus 10 further comprises an enclosed housing 16 (manufactured from a 20-gauge sheet steel) which defines an intake opening 16A at the top end thereof and an outlet opening 16B at the bottom end thereof. A poultry and swine carcass grinding mechanism is mounted within enclosed housing 16 and comprises grinding drum 18 and cooperatively associated carcass retention bar As can best be seen in FIGS. 3–6 of the drawings, grinding drum 18 (which will be described in specific detail hereinbelow) is oriented (although other orientations are contemplated by applicant as within the scope of the invention) within enclosed housing 16 and carcass retention bar 20 extends substantially parallel to the longitudinal axis of grinding drum 16 and is positioned adjacent but spaced-apart from grinding drum for cooperation therewith to facilitate pulverizing by grinding drum 18 of animal carcasses introduced into enclosed housing 16. The finely pulverized or ground animal carcass material will exit enclosed housing 16 by dropping through outlet opening 16B thereof.

Grinding drum 18 is rotatably mounted at each end thereof on conventional pillow block bearings 22 which are secured to frame 12. A motor 24, most suitably a DAYTON brand Model No. 6K885 high torque, capacitor start 230 VAC single phase motor having 10 horsepower is used to drive grinding drum 18 at a rotating speed of between about 1000 to 3000 RPM by means of a conventional v-belt and pulley assembly 26 (optional). Thus, it can be appreciated that motor 24 directly drives grinding drum 18 through v-belt and pulley assembly 26 without the necessity for an intermediate transmission. Also, grinding drum 18 could be mounted directly to the shaft of motor 24 (not shown) as a matter of design choice. Motor 24 is electrically connected to and actuated by an on/off switch S of control panel 28. Thus, in use, electric cord 28A of control panel 28 would be plugged into a suitable electric outlet in order to provide a current to motor 24 when the motor is actuated with on/off switch S of control panel 28. It will be appreciated that although applicant has described a specific motor, drive assembly and control system for motivating grinding drum 18 of apparatus 10, any similar power source for motivating grinding drum 18 may be used as a matter of design choice in the present invention.

Referring specifically now to FIGS. 3–6, applicant wishes to describe in detail the unique grinding mechanism of apparatus 10 which provides the ability to pulverize or grind poultry or swine carcasses into small particles suitable for subsequent processing and/or disposal. As noted hereinabove, grinding drum 18 is rotatably mounted to frame 12 by means of bearings 22 at each end thereof so as to rotate about its longitudinal axis. Grinding drum 18 is most suitably constructed of thick wall pipe (such as aluminum or steel) or a cylinder of plastic (such as polyethylene) and is provided with a helical groove 18' extending along the circumferential service of grinding drum 18. Helical groove 18' is sized so as to fixedly receive a strand of conventional chainsaw chain 18A therein which is helically wrapped around grinding drum 18 and anchored at each end thereof by means of an adjustable clevis and anchor stud in the drum. Most suitably, the depth of helical groove 18' in the grinding drum 18 is established such that the top cutting edge of chainsaw chain teeth 18A is between about ⅛ to ¼ inch above the surface of grinding drum 18.

Figure 3:
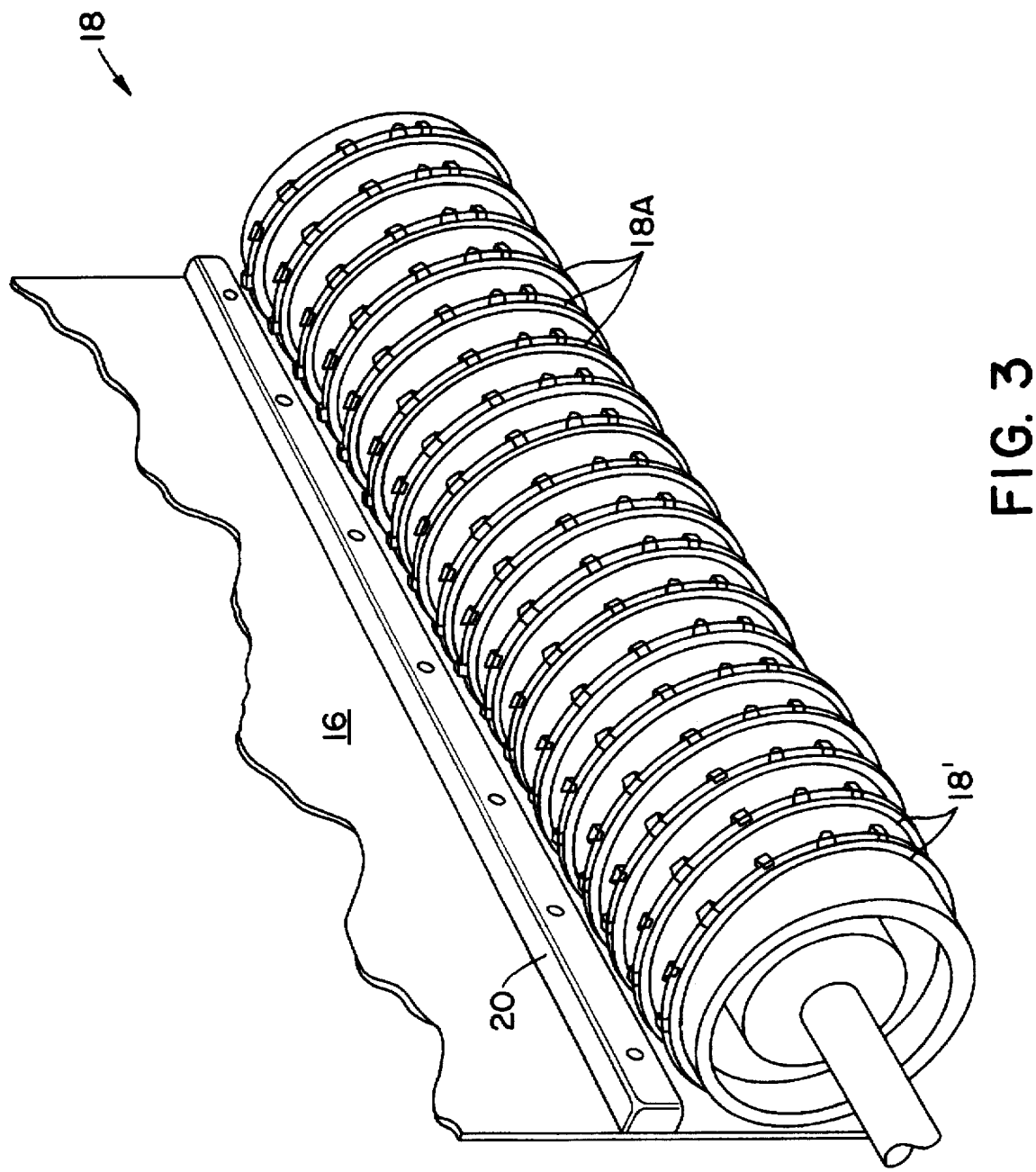
FIG. 3 is a perspective view of the grinding system used in the animal carcass pulverizing apparatus according to the present invention.
Figure 4:
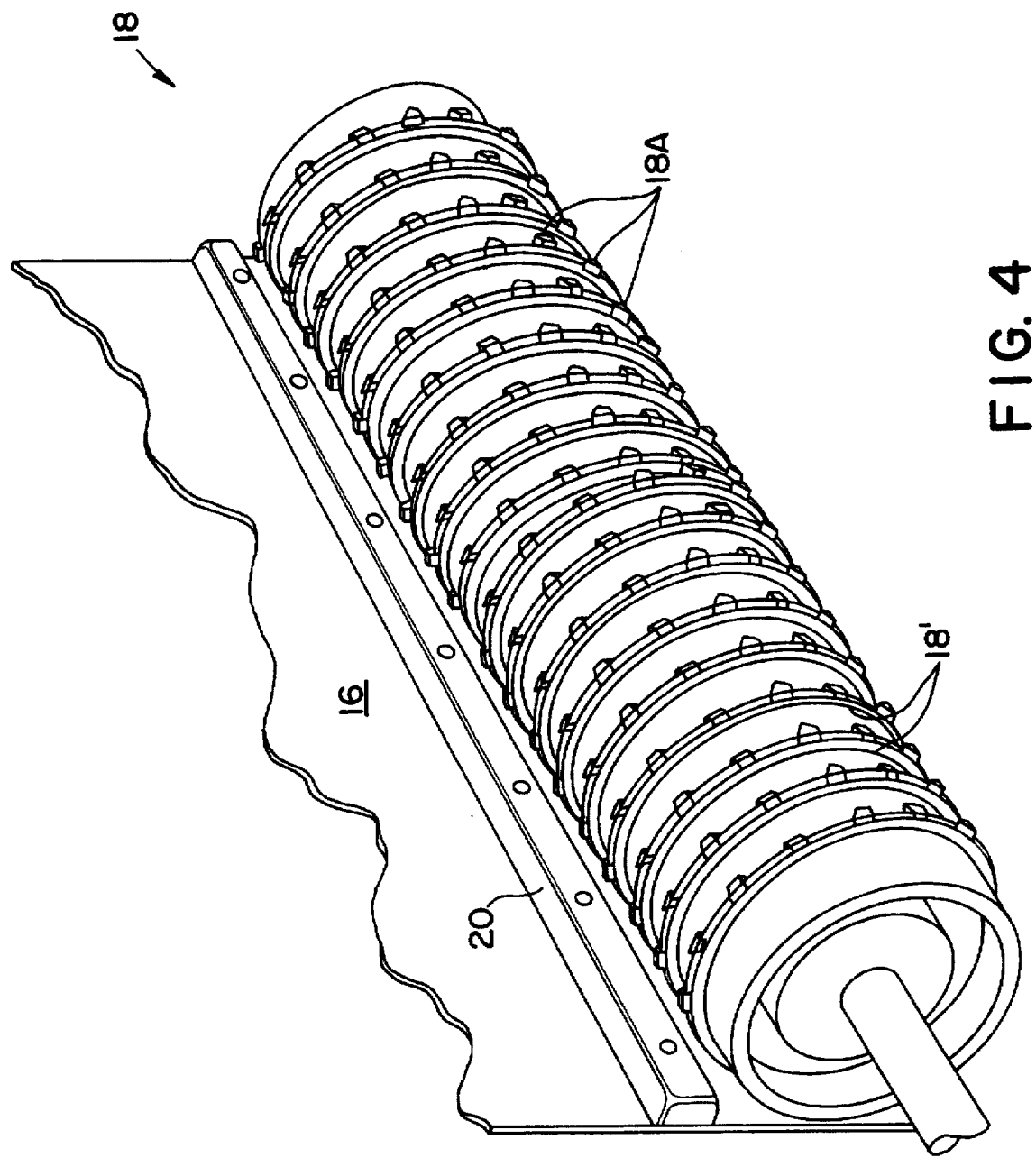
FIG. 4 is a perspective view of a second embodiment of the grinding system used in the animal carcass pulverizing apparatus according to the present invention.

As best seen in FIGS. 3 and 4, a carcass retention bar 20 is positioned parallel to and spaced-apart from grinding drum 20 so as to provide a minimum clearance between the bar and the teeth of chainsaw chain 18A. Thus, carcass retention bar 20 acts to stop the rotation and/or movement of the carcass being pulverized or ground by grinding drum 18 so as to allow the teeth of chainsaw chain 18A to grind or pulverize (e.g., cut) the carcass material into fine particles which then pass between grinding drum 18 and carcass retention bar 20. Once the finely ground carcass material has passed beneath carcass retention bar 20, the centripetal forces of grinding drum 18 act to throw the finely ground carcass material off of grinding drum 18 and through outlet opening 16B of enclosed housing 16. As mentioned hereinbefore, the finely ground waste material may then be subsequently processed for ultimate use and/or disposal.

Although a number of subsequent processing steps are well known in the art, applicant particularly contemplates that apparatus 10 is well suited for use in combination with a fermentation process and/or extrusion pelletizing processes. Applicant further contemplates that a non-transportable embodiment of apparatus 10 could be mounted directly to the top of a fermentation tank such that an appropriate amount of readily fermentable carbohydrate, water and fermentation culture could be added to the mixture, and the mixture then sealed in a vented container to encourage and maintain an anaerobic fermentation. This use of applicant's novel pulverizing apparatus for lactic acid fermentation of poultry or swine carcasses would provide a particularly attractive technique for disposing of the dead stock without contaminating the environment with excessive nutrients and odor. The fermented product could, of course, either be recycled into certain feed ingredients by any of a number of processes (including extrusion, pelletizing, drying, etc.) rendered, incinerated or buried.

It can be seen with reference to FIGS. 3 and 4 of the drawings that grinding drum 18 may be constructed with a single direction chainsaw chain helix (right or left-hand helix) such as the right-hand helix shown in FIG. 3. Alternatively, the strand of chainsaw chain 18A could be secured to grooves within grinding drum 18 in such a fashion as to define a right-hand helix on one half of the grinding drum 18 and a left-hand helix on the other half of the grinding drum 18 (see FIG. 4) so that the chainsaw chain helix would tend to encourage the poultry or swine carcass being ground to the midsection of grinding drum 18. If a conveyor (not shown) were positioned beneath outlet opening 16B of enclosed housing 16, this would be particularly desirable since the majority of the finely ground material would be positioned in the medial portion of the conveyor. This, of course, would not be a significant consideration if the animal carcass pulverizing apparatus were integrated directly to a fermentation tank or the like. However, regardless of the helical configuration of chainsaw chain strand 18A, the distance between carcass retention bar 20 and the top surface of the grinding teeth cannot be less than the height of chainsaw chain strand 18A above the surface of grinding drum 18 since chainsaw chain strand 18A is "traveling" with respect to carcass retention bar 20 during grinding due to the helical pitch thereof.

As mentioned hereinbefore, chainsaw chain strand 18A is secured within helical groove 18' in grinding drum 18 in a generally helical pattern so that the pulverizing or grinding action is continual and uniform in the longitudinal direction of grinding drum 18 without the need to have cutting teeth covering the entire surface of grinding drum 18. This reduces the cost of constructing apparatus 10 by reducing the quantity of cutting teeth required to be present on the circumferential surface of grinding drum 18. Also, applicant contemplates that one continuous strand of chainsaw chain 18A may be utilized and secured to grinding drum 18 for ease of replacement and maintenance of carcass pulverizing apparatus 10. As would be apparent to one skilled in the art, the aggressiveness of grinding drum 18 can be varied by: (1) altering the pitch of the helix of chainsaw chain strand 18A (e.g., the smaller the pitch the greater the number of cutting passes the chain makes per revolution of the grinding drum); (2) varying the rotating speed of grinding drum 18; and (3) changing the clearance between the top surface of the teeth of chainsaw chain strand 18A and the surface of grinding drum 18.

Figure 5:
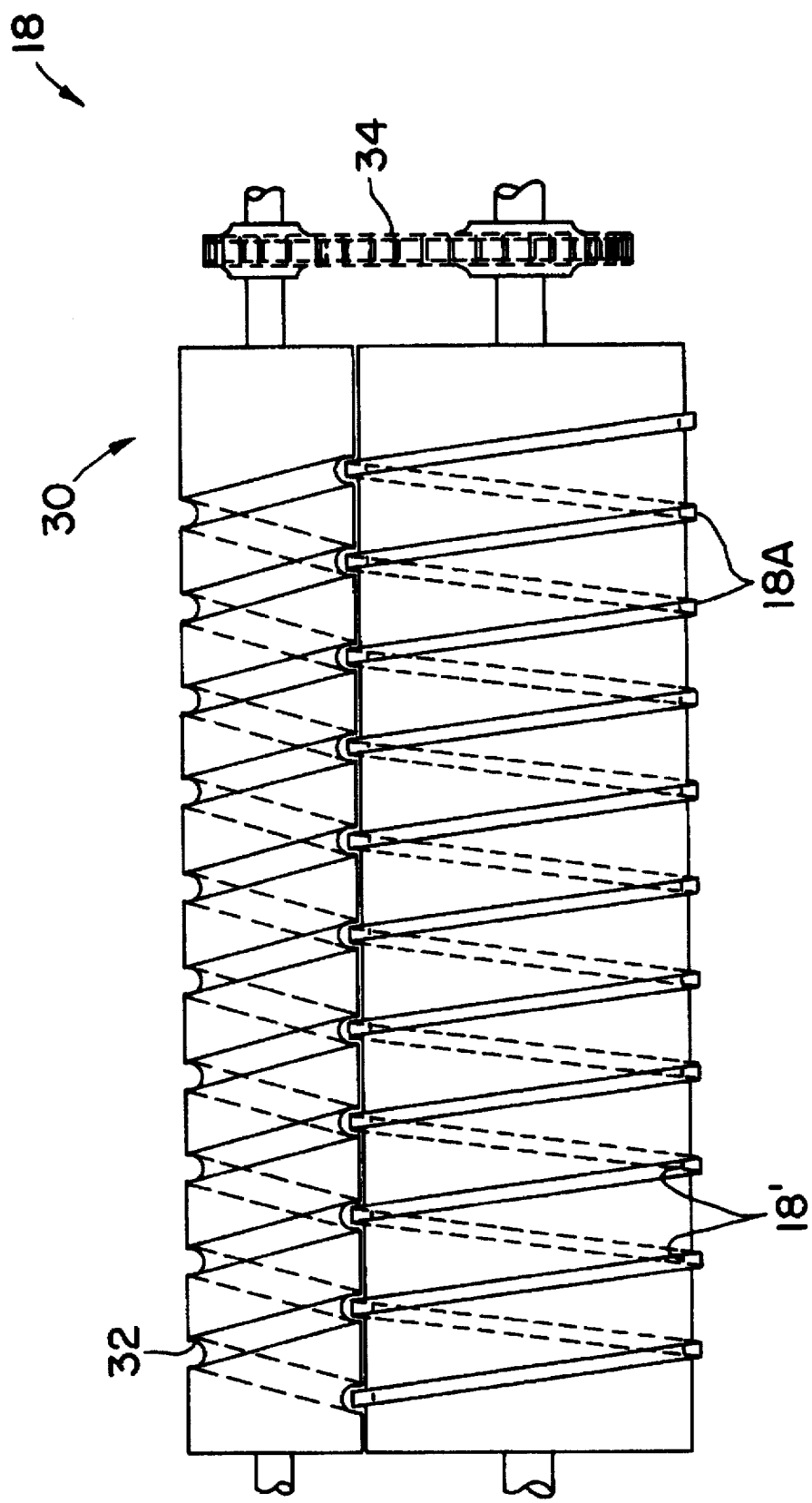
FIG. 5 is a front elevation view of a third alternative embodiment of the grinding system used in the animal carcass pulverizing apparatus according to the present invention.

Referring now to FIG. 5, an alternative embodiment of the grinding mechanism of carcass pulverizing apparatus 10 is shown. In this embodiment of applicant's invention, a mating grooved roller 30 is used in lieu of carcass retention bar 20 and is believed likely to result in providing even finer and more uniform ground carcass particles. Grooved roller 30 is provided with a helical groove 32 therein defining a pitch such that as the grooved roller 30 is driven by grinding drum 18 (via sprocket and chain assembly 34), groove 32 at the line of interaction between the two cylinders always coincides with chainsaw chain strand 18A. In view of the mating relationship between rotating grinding drum 18 and rotating grooved roller 30, the only ground carcass material allowed to pass therebetween and out outlet end 16B of housing 16 would be carcass material ground small enough to pass through the space between the cutting teeth of chainsaw chain strand 18A and groove 32 of grooved roller 30 through which it is passing. Thus, helical groove 32 of grooved roller 30 could be varied in size relative to the teeth of chainsaw chain strand 18A so that the fineness of the carcass material could be changed in accordance with desired processing parameters.

Applicant presently contemplates that the preferred embodiment of grooved roller 30 shown in FIG. 5 of the drawings would most suitably be smaller in diameter than grinding drum 18 and would not be required to rotate at the same circumferential speed as grinding drum 18, and grooved roller 30 and grinding drum 18 would be in light sliding contact or near contact. As a matter of design choice, the ratio of grooved roller 30 RPM to grinding drum 18 RPM will serve to determine the groove pitch required in grooved roller 30. For example, if grooved roller 30 were being driven by grinding drum 18 at twice the RPM of grinding drum 18, the pitch of groove 32 defined within grooved roller 30 would be half the pitch of chainsaw chain strand 18A on grinding drum 18. If grooved roller 30 and grinding drum 18 were rotating at the same RPM, the pitch of groove 32 of grooved roller 30 and chainsaw chain strand 18A would need to be equal.

Although other configurations are possible, applicant presently prefers that grooved roller 30 and grinding drum 18 should rotate in the same direction as best seen in FIG. 5. Otherwise, there could possibly be a greater tendency to tension-pull carcass material between grooved roller 30 and grinding drum 18 before the grinding process is completed.

With final reference to FIG. 5, applicant's preferred embodiment of the invention provides that the circumferential speed of grooved roller 30 should be equal to or greater than the circumferential speed of grinding drum 18 so as to facilitate expelling feathers and other material from the grinding mechanism and to minimize pinching and passing of these materials between grinding drum 18 and grooved roller 30. Optionally, a scraper bar or plate (not shown) could be provided on grooved roller 30 to prevent waste material from being carried around it during use of pulverizing apparatus With reference to FIG. 6 of the drawings, another alternative embodiment 40 of the grinding mechanism is shown which utilizes a plurality of plastic (or rubber) grooved blocks 42 secured to a continuous roller-type chain 44 in such a way that the lower run of the continuous loop of blocks 42 serve, in effect, as a moving carcass retention bar. Chain 44 carrying blocks 42 would be driven through worm gear mechanism 46 by grinding drum 18 so that the notches 42A defined within blocks 42 would coincide with the helix of chainsaw chain strand 18A at all times during the operation of grinding drum 18.

Although all of the preferred embodiments of apparatus 10 described hereinabove incorporate a strand of chainsaw chain 18A around grinding drum 18, applicant contemplates that the invention includes any and all other structural configurations that would provide a helical orientation of grinding teeth upon the circumferential surface of grinding drum 18 to perform the grinding function of the invention.

Figure 7:
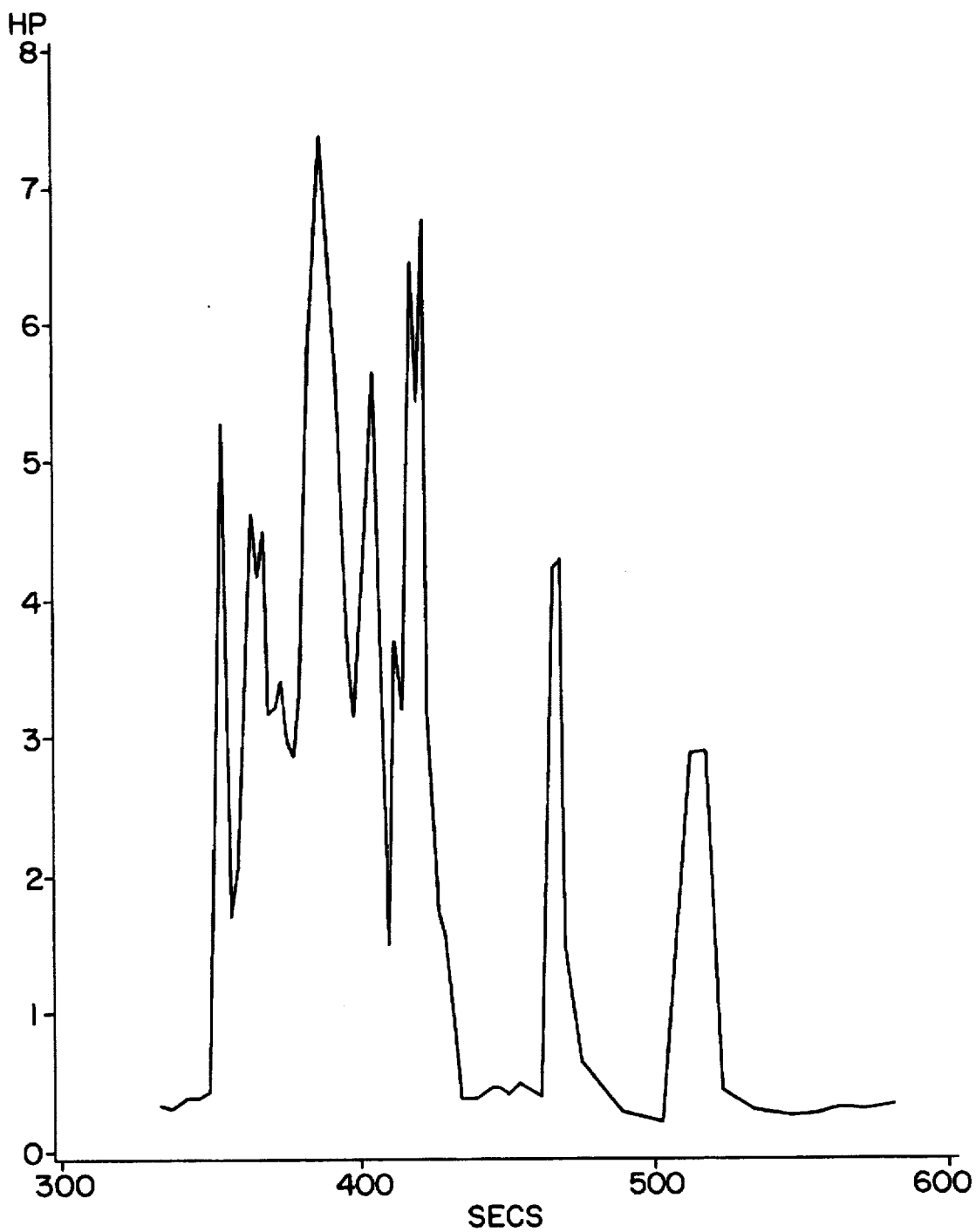
FIG. 7 is a graph of motor horsepower vs. grinding time using the apparatus according to the present invention to process turkeys.
Figure 8:
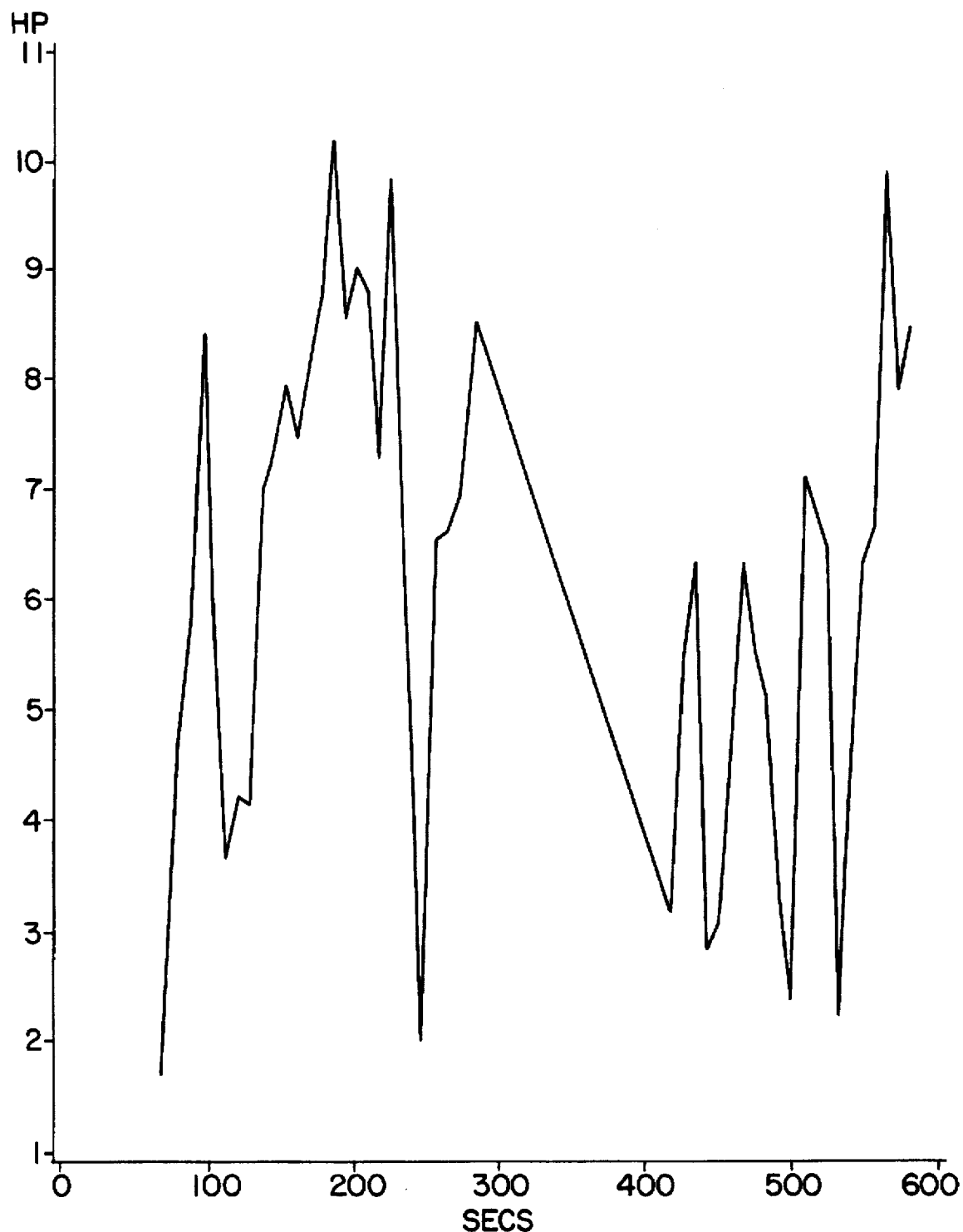
FIG. 8 is a graph of motor horsepower vs. grinding time using the apparatus according to the invention to process hogs.
Figure 9:
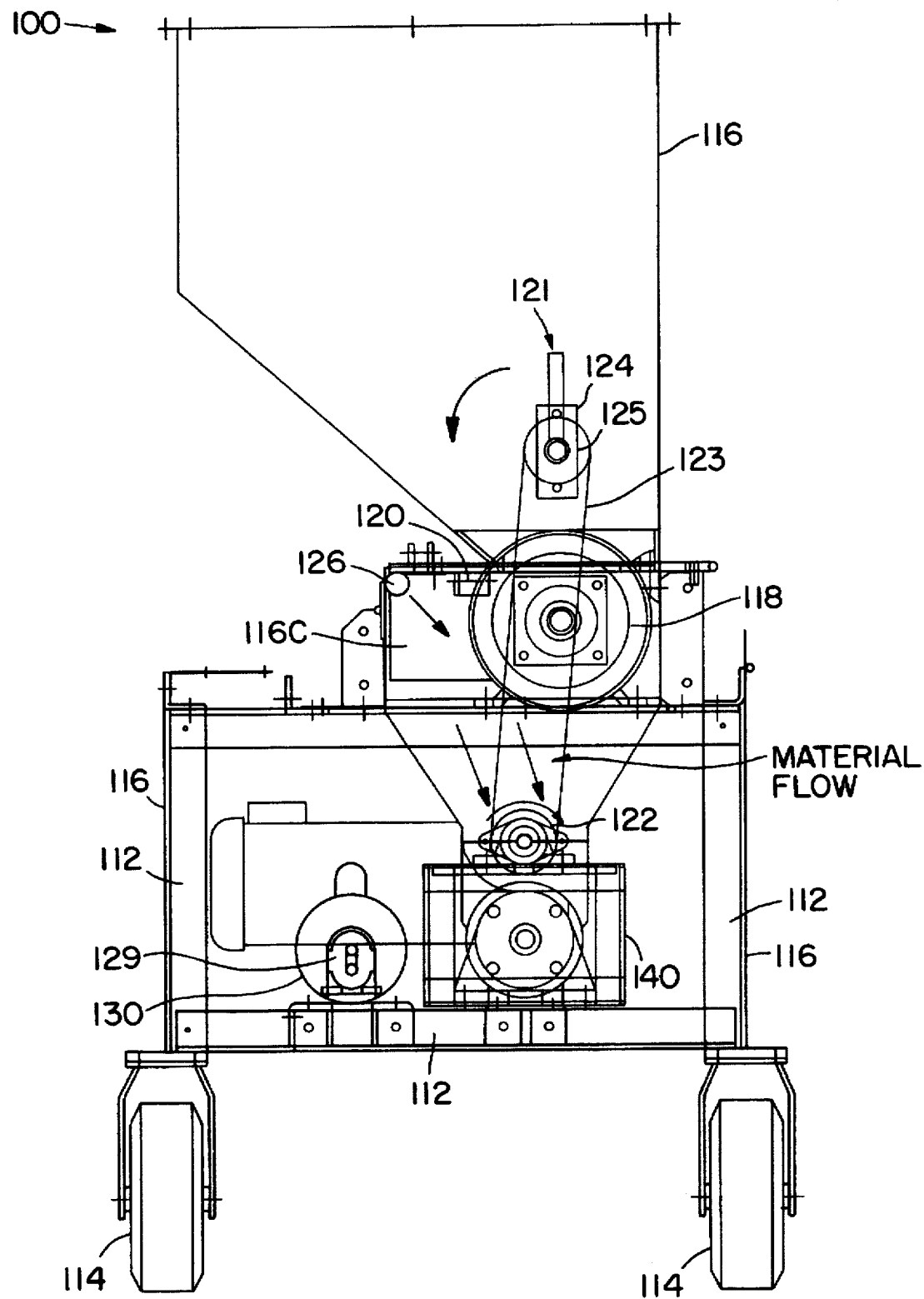
FIG. 9 is an anterior end elevation view of the animal carcass grinder/mixer system according to the present invention.

The performance of apparatus 10 can be appreciated with reference to the graphs of FIGS. 7 and 8 illustrating the instantaneous horsepower input to the grinding drum 10 vs. time for turkey and hogs.

SECOND EMBODIMENT OF THE INVENTION

Referring now more particularly to the drawings, FIGS. 9–13 illustrates the animal/material pulverizing apparatus described above integrated with a material input agitator 121, catalyst applicator 126, bridge breaker paddle P, and material transfer pump 140 to provide a system for pulverizing and fermentation which is generally designated 100. The system 100 provides a grinder, as described above in the best mode for practicing the invention, and is an integration of this grinder with several additional pieces of innovative technology which act in concert to automatically prepare and transfer the material, namely animal carcasses and other organic matter, in a form and mixture suitable for ensiling or further processing.

A preferred embodiment of system 100 is best seen in FIGS. 9–13 and comprises a angle-iron frame 112 which is mounted on wheels 114 in a wagon- or trailer-like configuration so as to be adapted to be pulled by a truck or other suitable vehicle (not shown) or maneuvered by hand. System 100 further comprises an enclosed housing 46 (manufactured from a 20-gauge steel sheet, which defines an intake opening 116A and/or 116B at the top thereof and an outlet opening 116C at the bottom end thereof. The grinding drum 118 is mounted within the enclosed housing 116 and cooperatively associated carcass retention or striker bar 120. The grinding drum 118 is described in detail above in the best mode for carrying out the invention.

The material input agitator apparatus 121 (optional) is mounted within the enclosed housing 116 and rotates above the grinding drum 118, shifting the position of the unground subject along the drum 118 thus enhancing the grinding procedure. The agitator 121 rotates at 60 rpm and is driven by sprockets 122 and roller chain 123 off the lower bridge breaker shaft 131 which is in turn driven off the material transfer pump drive shaft with sprockets and roller chain.

For models without a lower bridge breaker assembly, the agitator shaft is directly coupled to a gear motor mounted off the main frame of the grinder. The agitator 121 consists of an agitator bar which is slightly shorter than the length of the grinding drum welded to arms 124 on each end. Arms 124 (approximately 7.0 inches long) have collars 125 welded on the ends opposite the agitator bar so that a shaft will slide into the collars and the agitator bar and arms weldment can be attached to the shaft by bolts through the collars and shaft. The shaft is mounted with two flange bearings on the outside of the top hopper locating the agitator shaft approximately 8" above the grinder drum surface.

The automatic catalyst feed apparatus consists of a spray bar 126 conveying liquid catalyst into the ground material flow area 116C. The spray bar 126 is a 0.5 inch in diameter pipe and runs parallel along the full length of the grinding drum 118. Spray bar 126 is located a few inches away from the grinding drum lib behind the striker bar 120. Small holes spaced 1.0 inches apart along the spray bar 126 are positioned such that catalyst is applied as a spray into the output of the grinding area 116C. The spray bar 126 acts as a manifold as catalyst is pumped directly into the anterior end of the bar nearest the pump and the posterior end is occluded by an impermeable cap. A flexible tube 128 communicates from the posterior end of the spray bar 126 to catalyst pump 129. The catalyst pump is preferably a brass gear pump designed to handle highly viscous material (10,000 SSU) directly driven by a conventional ⅓ hp, 1150 rpm electric motor 130.

Catalyst pump 129 and motor 130 is mounted to the main frame adjacent to material transfer pump 140. In order to only pump catalyst when material is being ground, the catalyst pump motor is turned on by a current sensing device. This current sensing device is sensing the amperage load on a power wire feeding the grinder drive motor. When the amperage goes above a set point which represents the no load amperage, it switches on a relay which turns on the catalyst pump motor and when the amperage drops back down to the set point or below (when there is no grinding load on the grinder drum), the relay turns the catalyst pump off.

Figure 10A:
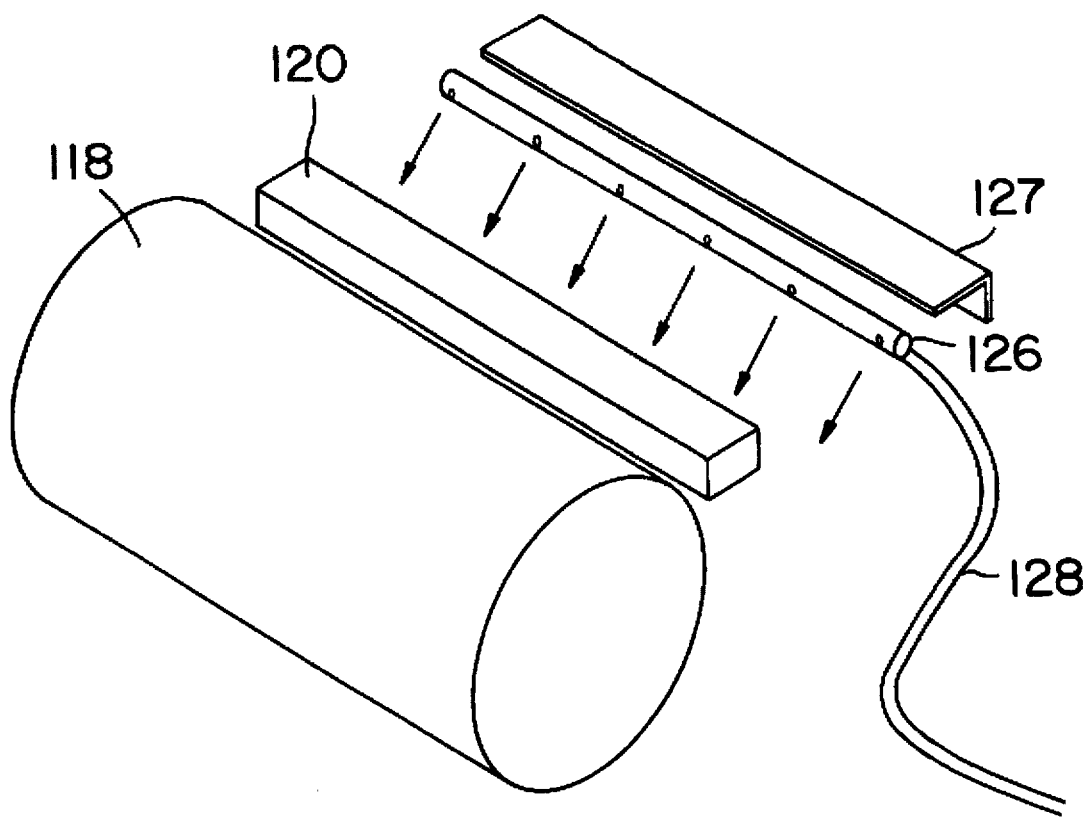
FIG. 10A is a schematic illustration of the apparatus for applying liquid catalyst using the spray bar and FIG. 10B shows application of a dry catalyst using an auger in the system shown in FIG. 9.
Figure 10B:
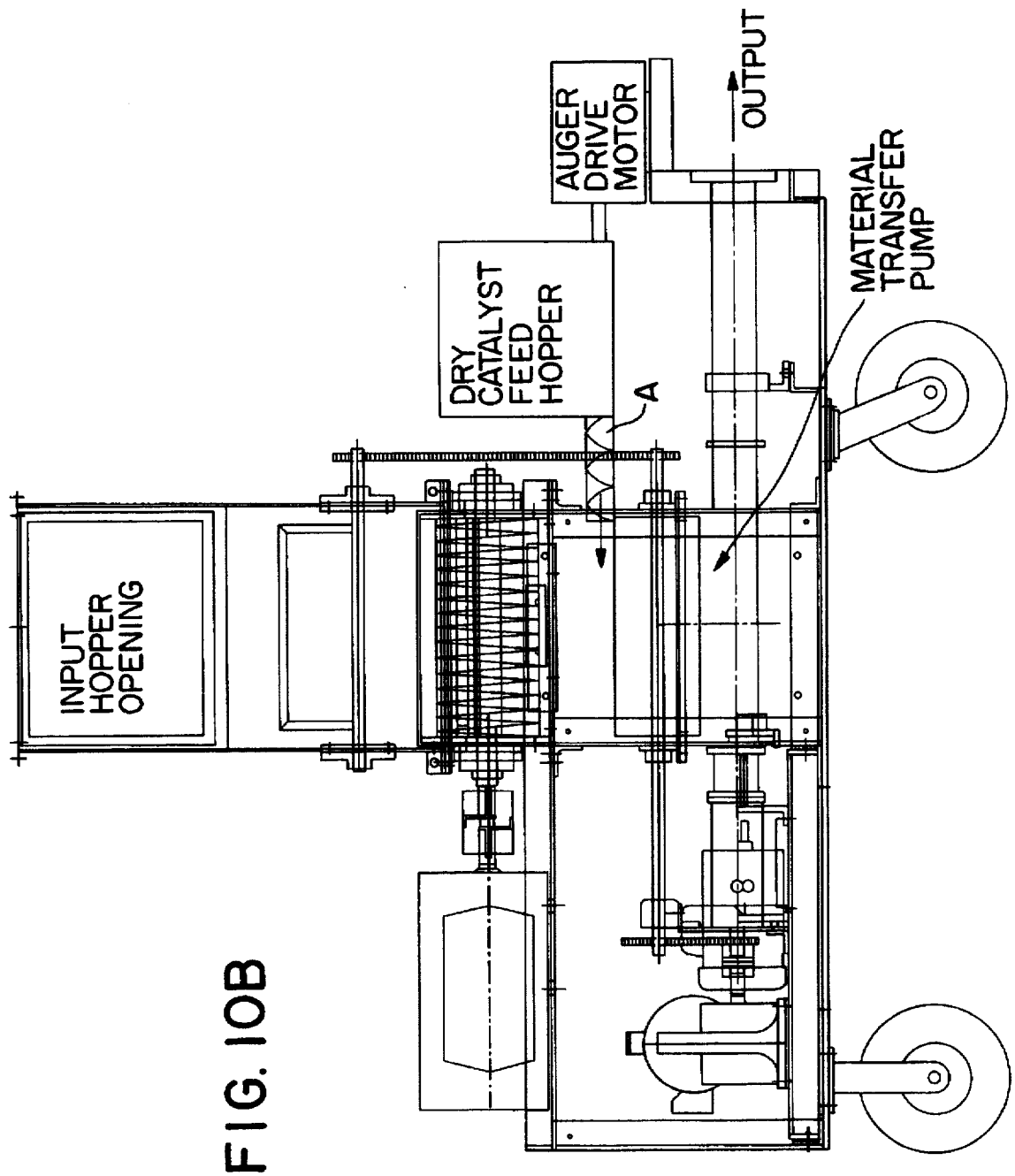
Figure 11:
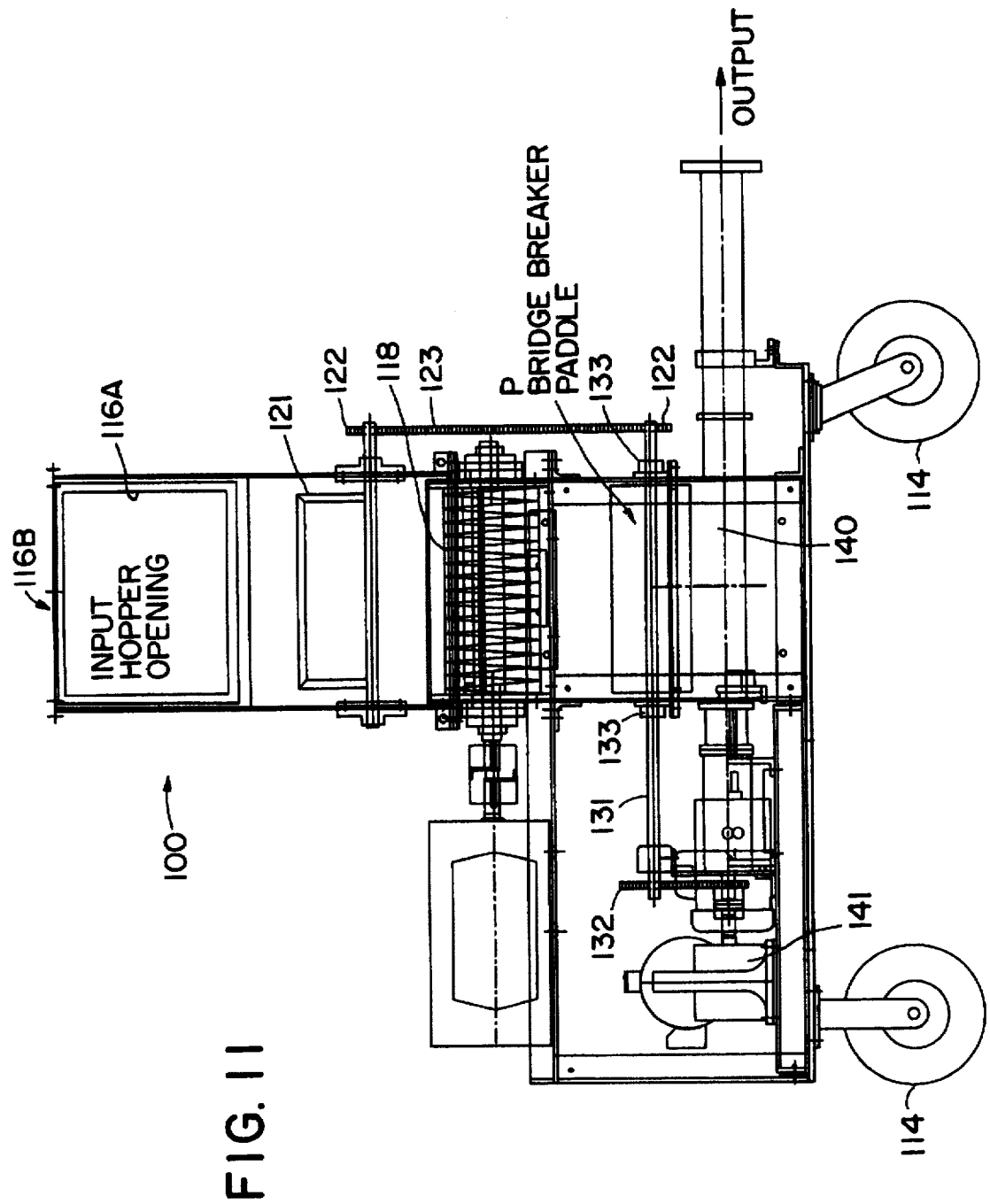
FIG. 11 is the front elevation view of the system shown in FIG. 9, detailing the material input agitator, grinding drum, bridge breaker, and material transfer pump.
Figure 12:
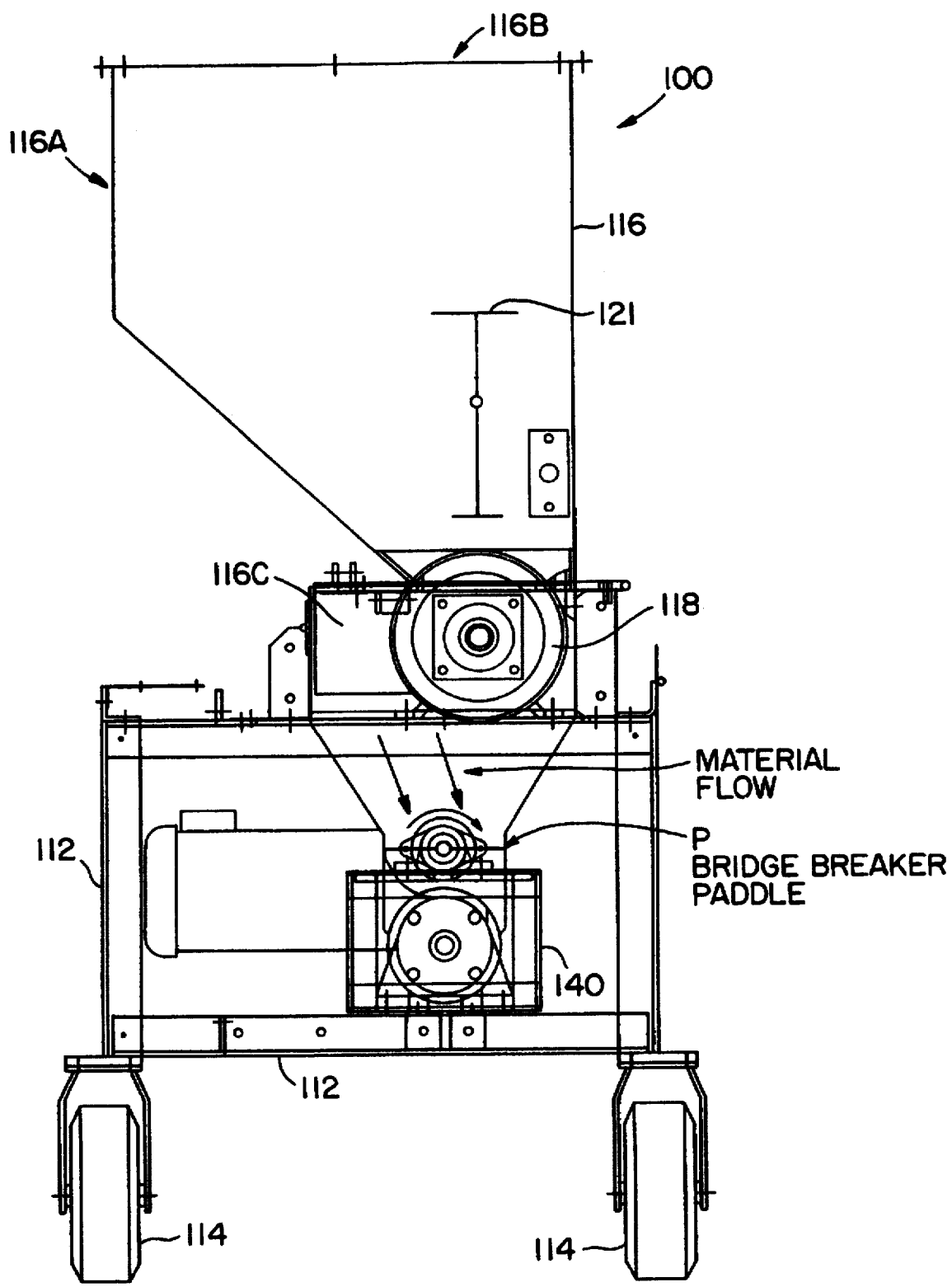
FIG. 12 is a posterior end elevation view of the system shown in FIG. 9.

The same control scheme is used to switch on and off the drive gear motor (½ hp, 100 rpm) which is used to power an auger A for feeding dry catalyst material when this option is utilized (see FIG. 10B). The dry catalyst feed auger A is approximately 2.0 inches in diameter and enclosed in a plastic pipe. It is mounted under a dry catalyst hopper where the material is kept during grinding (see FIG. 10B).

The bridge breaker apparatus consists of paddle P which is about the same size and shape as the opening of the small hopper of the transfer pump 140. The paddle P is mounted on a shaft 131 which is driven by a chain and sprocket 132 off of the drive shaft of the material transfer pump motor 141. The bridge breaker shaft 131 is rotatably mounted at each end thereof on conventional pillow block bearings 133 which are secured to the enclosed housing 116. The bridge breaker shaft is 1.0 inches in diameter with a driven sprocket of 30 teeth mounted with a woodruff key and set screw on the end. The shaft is located directly above the material transfer drive shaft so that a 12 tooth drive sprocket on the material transfer pump shaft is in position to drive the bridge breaker shaft #40 roller chain. This results in a bridge breaker rotation speed at a ratio of 0.4:1 to the transfer pump speed (usually about 50 rpm).

The material transfer pump 140 is mounted on the frame 112 by a mounting plate located in the bottom of the main frame. The input hopper of the material transfer pump is attached to the output hopper of the grinder directly underneath. The material transfer pump is a special design manufactured by BORNEMANN and was developed specifically for pumping this material. The sizes range from a #236 (approximately 75 lb./min.) to a #1500 (approximately 300 lb./min.). The input hopper on the pump is a common size so that the actual size of the material transfer pump (determined by the pump rotor and stator) can be changed without removing the entire pump assembly. The rotor and stator can be removed and an adapter plate allows a different size rotor and stator to be attached. The stator was modified to have a smoother flow cavity around the transition area between the input auger inside the input hopper and the rotor/stator input.

The system control panel is mounted to the main frame with vibration isolators to protect the electrical components from the inherent vibration of the grinder. The electrical box is a NEMA 13 (weatherproof) rated enclosure with a swing open door. All the motor starters and protectors are located in the box along with the current sensing device for the catalyst pump. The on/off switches and selector switches are located on the main motor cover for easy access and are wired into the electrical box to the motor starters. The set point for the current sensing device is adjusted by opening the electrical box and turning a set screw on the device.

Figure 13:
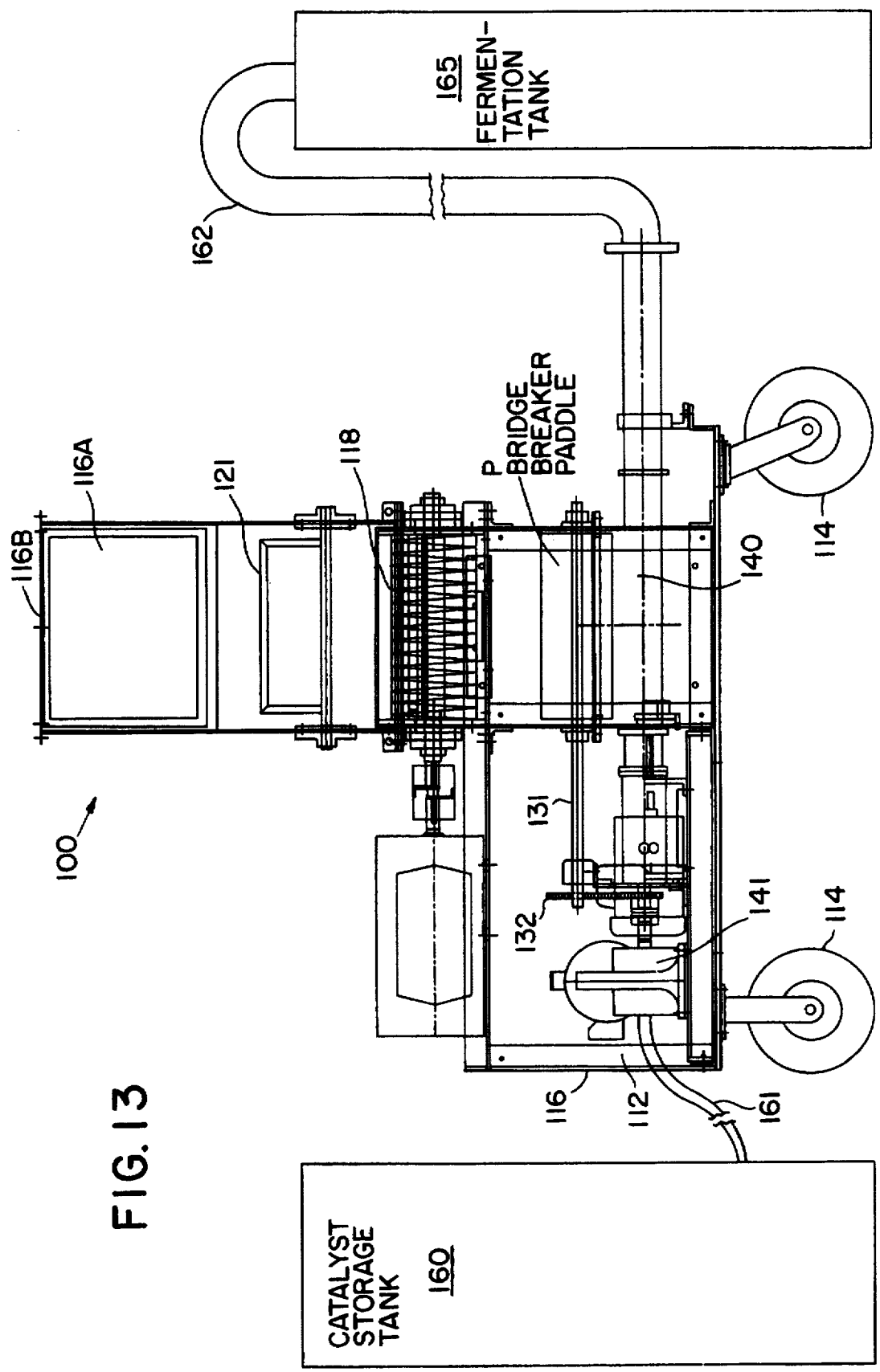
FIG. 13 shows the system of the present invention integrated with an anterior liquid catalyst tank and posterior fermentation/storage tank.

The invention can be integrated for the purpose of ensiling animal carcasses (see FIG. 13). A large polyethylene tank 160, or any other suitable container, holds a reserve of liquid catalyst. The size of the catalyst container can be varied depending upon the desired storage capacity. A catalyst supply hose 161 communicates to the catalyst pump. The material transfer hose 162 ("Tigerflex" transparent with diameters ranging from 1.5 inches to 3.0 inches depending on size of machine) is connected on one end to the output of the material transfer pump 140 extends to the input of the storage/fermentation container 165. The material transfer hose 162 is joined to the storage/fermentation container 165 by a standard "quick-coupled" easy to remove coupling. The container is an air-tight vessel vented with a standard poppet style plastic weatherproof spring-loaded pressure relief value set to release gas generated within the container at 10 lb. pressure.

It will be understood that various details of the invention may be changed without departing from the scope of the invention. Furthermore, the foregoing description is for the purpose of illustration only, and not for the purpose of limitation—the invention being defined by the claims.

What is claimed is:

1. An apparatus for pulverizing organic material such as animal carcasses and the like and for preparing the organic material for fermentation and/or further processing, comprising:

(a) an enclosed housing having an intake opening and an outlet opening;

(b) grinding means positioned between the intake and outlet openings of said enclosed housing for producing finely ground organic matter from animal carcasses introduced into the intake opening of said enclosed housing, said grinding means comprising a grinding drum having a removable strand of raised cutting teeth extending in helical orientation along the longitudinal length thereof and carcass retention means positioned adjacent the length of said grinding drum for cooperation therewith to facilitate pulverizing of animal carcasses by said grinding drum;

(c) motor means for rotating said grinding drum;

(d) catalyst applicator means for applying a catalyst to pulverize animal carcass organic material created by said grinding drum; and (e) pump means for transferring said pulverized and catalyst treated animal carcass organic material to a storage/fermentation container.

2. An apparatus according to claim 1, wherein said apparatus is mounted on a support frame having a plurality of wheels rotatably secured thereto and wherein said support frame is adapted for attachment to a transport vehicle.

3. An apparatus according to claim 1, wherein said enclosed housing is formed from sheet steel having an upper and a lower portion and wherein the intake opening is in the upper portion and the outlet opening is in the lower portion of said housing.

4. An apparatus according to claim 1, wherein said cutting teeth of said grinding drum extend in a single direction helix along the longitudinal length of said grinding drum.

5. An apparatus according to claim 1, wherein said cutting teeth of said grinding drum define a right hand helix along a first section of the longitudinal length of said grinding drum and a left hand helix along a second section of the longitudinal length of said grinding drum so as to direct the animal carcasses and the like being ground generally toward a medial section of the longitudinal length of said grinding drum.

6. An apparatus according to claim 1, wherein said cutting teeth comprise a strand of chainsaw chain teeth which has been removably mounted around the circumferential surface of said grinding drum.

7. An apparatus according to claim 1, wherein said carcass retention means comprises an elongated bar mounted to said enclosed housing and extending substantially parallel to the longitudinal axis of said grinding drum, said elongated bar being spaced-apart from said grinding drum at least a distance equal to the height of said raised cutting teeth thereof.

8. An apparatus according to claim 1, wherein said motor means comprises an electric motor.

9. An apparatus according to claim 8, wherein said electric motor is directly connected to said grinding drum by a v-belt and pulley assembly.

10. An apparatus according to claim 1 including at agitator means comprising a bar rotatably mounted within said enclosed housing above and spaced-apart from said grinding drum.

11. A apparatus according to claim 1 wherein said catalyst applicator means comprises spray means for applying a liquid catalyst.

12. An apparatus according to claim 1 wherein said catalyst applicator means comprises auger means for applying a liquid catalyst.

13. An apparatus according to claim 1 wherein said pump means is connected to said storage/fermentation tank by a flexible hose.

14. An apparatus according to claim 13 including a storage/fermentation container comprising an air tight vessel.

15. An apparatus of claim 1 including a bridge breaker paddle rotatably mounted between said grinding means and said pump means.

* * * * *